US010464169B2

(12) United States Patent
Fontana et al.

(10) Patent No.: US 10,464,169 B2
(45) Date of Patent: Nov. 5, 2019

(54) PROGRAMMABLE ASSEMBLY AND WELDING OF METALLIC NANOPARTICLES INTO DISCRETE NANOSTRUCTURES

(71) Applicant: The Government of the United States of America, as represented by the Secretary of the Navy, Arlington, VA (US)

(72) Inventors: Jake Fontana, Alexandria, VA (US); Steven R. Flom, Alexandria, VA (US); Jawad Naciri, Arlington, VA (US); Banahalli R. Ratna, Alexandria, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 316 days.

(21) Appl. No.: 15/455,577

(22) Filed: Mar. 10, 2017

(65) Prior Publication Data
US 2017/0259381 A1 Sep. 14, 2017

Related U.S. Application Data

(60) Provisional application No. 62/306,942, filed on Mar. 11, 2016.

(51) Int. Cl.
*B23K 26/32* (2014.01)
*C09D 133/02* (2006.01)
(Continued)

(52) U.S. Cl.
CPC .............. *B23K 26/32* (2013.01); *B01J 19/121* (2013.01); *B23K 26/0624* (2015.10);
(Continued)

(58) Field of Classification Search
CPC .... B23K 26/32; B23K 26/0624; B01J 19/121; C09D 133/02; B82Y 40/00; Y10S 977/895
(Continued)

(56) References Cited

U.S. PATENT DOCUMENTS

2008/0241262 A1  10/2008  Lee et al.
2009/0263485 A1  10/2009  Li et al.
(Continued)

FOREIGN PATENT DOCUMENTS

WO   WO-2011-006002 A2   1/2011

OTHER PUBLICATIONS

Olesiak-Banska et al, "Gold nanorods as multifunctional probes in a liquid crystalline DNA matrix," Nanoscale, 2013, vol. 5 pp. 10975-10981 (Year: 2013).*
(Continued)

*Primary Examiner* — Nicholas A Smith
*Assistant Examiner* — Colleen M Raphael
(74) *Attorney, Agent, or Firm* — US Naval Research Laboratory; Roy Roberts (57) ABSTRACT

Metallic nanorods are welded together in a controllable fashion. A suspension of metallic nanorods coated with an anionic polymer is contracted with linking molecules each comprising a liquid crystal with at least two available carboxylic acid moieties. The nanoparticles to self-assemble into dimers. Irradiation of the dimers with femtosecond radiation forms a metallic junction between them and welds the dimers into fused dimers.

5 Claims, 8 Drawing Sheets

(51) Int. Cl.
   *B01J 19/12* (2006.01)
   *B82B 3/00* (2006.01)
   *B82Y 40/00* (2011.01)
   *B23K 26/0622* (2014.01)
(52) U.S. Cl.
   CPC ............ *C09D 133/02* (2013.01); *B82Y 40/00* (2013.01); *Y10S 977/895* (2013.01)
(58) Field of Classification Search
   USPC .................................................. 204/157.41
   See application file for complete search history.

(56) References Cited

U.S. PATENT DOCUMENTS

2014/0012224 A1   1/2014   Zhang et al.
2014/0135516 A1   5/2014   Mandelbaum et al.
2015/0247803 A1   9/2015   Fontana et al.

OTHER PUBLICATIONS

Park et al, "Controllable Side-by-Side and End-to-End Assembly of Au Nanorods by Lyotropic Chromonic Materials," Langmuir, 2008, vol. 24, pp. 13833-13837 (Year: 2008).*

L. O. Herrmann, V. K. Valev, C. Tserkezis, J. S. Barnard, S. Kasera, O. A. Scherman, J. Aizpurua, and J. J. Baumberg, "Threading plasmonic nanoparticle strings with light," Nat Commun 5 (2014).
J. Fontana, and B. R. Ratna, "Highly tunable gold nanorod dimer resonances mediated through conductive junctions," Applied Physics Letters 105, 011107 (2014).
H. S. Park, A. Agarwal, N. A. Kotov, and O. D. Lavrentovich, "Controllable Side-by-Side and End-to-End Assembly of Au Nanorods by Lyotropic Chromonic Materials," Langmuir 24, 13833-13837 (2008).
O. Perez-Gonzalez, N. Zabala, A. G. Borisov, N. J. Halas, P. Nordlander, and J. Aizpurua, "Optical Spectroscopy of Conductive Junctions in Plasmonic Cavities," Nano Letters 10, 3090-3095 (2010).
P. Pramod, and K. G. Thomas, "Plasmon Coupling in Dimers of Au Nanorods," Advanced Materials 20, 4300-4305 (2008).
International Search and Opinion dated Jun. 1, 2017 in PCT/US2017/021789.
Extended European Search Report dated Feb. 22, 2019 in EP application No. 17764187.5.
A. Hu et al.,"Femtosecond laser induced surface melting and nanojoining for plasmonic circuits," Proceedings of SPIE, vol. 8809, Sep. 11, 2013 (Sep. 11, 2013), p. 880907, XP055551567.

* cited by examiner

PROGRAMMABLE ASSEMBLY AND WELDING OF METALLIC NANOPARTICLES INTO DISCRETE NANOSTRUCTURES

CROSS-REFERENCE TO RELATED APPLICATIONS

This Application claims the benefit of U.S. Provisional Application 62/306,942 filed on Mar. 11, 2016, the entirety of which is incorporated herein by reference.

BACKGROUND

The ability to controllably interconnect metallic nanoparticles with nanometer scale metallic junctions, enabling charge transfer at optical frequencies, while simultaneously producing such nanostructures in macroscale quantities has proven difficult. A need exists to surmount this problem.

One group has reported experiments demonstrating that gold nanorods can be welded together into oligomers (Gonza☐lez-Rubio et al., Nano Lett. 2015, 15, 8282-8288.) The specificity and yield of welded oligomers using this approach was very low, with CTP absorbance peaks <0.1 and full-width-at-half-maximum (fwhm)>>500 nm. These oligomer experiments do not demonstrate the controlled concatenation and welding of the nanorods but instead show random agglomeration, which is expected upon exposure to an intense laser pulse. Moreover, this laser-based technique lacked control of the configuration (or orientation) by which the nanorods assemble. Consequently, there remains a significant need for alternative approaches to efficiently and controllably produce large, high-quality yields of welded nanorod structures.

BRIEF SUMMARY

Described herein is a directed molecular assembly process involving controllably concatenating metallic nanorods end to end into discrete linear structures, bridged with conductive nanojunctions formed using femtosecond (fs) laser light. By utilizing high throughput and nanometer resolution this approach offers a pragmatic assembly strategy for charge transfer plasmonic systems.

A method of welding metallic nanorods includes providing a suspension of metallic nanorods coated with an anionic polymer; then contacting with nanorods with linking molecules each comprising a liquid crystal with at least two available carboxylic acid moieties; then allowing the nanoparticles to self-assemble into dimers, then irradiating the dimers with femtosecond radiation, thereby forming a metallic junction therebetween and welding the dimers into fused dimers having a charge transfer plasmon (CTP) absorbance peak.

BRIEF DESCRIPTION OF THE DRAWINGS

FIGS. 1A through 1D schematically illustrate an exemplary assembly process.

DETAILED DESCRIPTION

Definitions

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used in this specification and the appended claims, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

As used herein, the term "nanoparticle" refers to a particle having a largest dimension of at least about one nanometer and no greater than about 300 nanometers.

As used herein, the term "aspect ratio" or "AR" refers to the ratio of length to diameter of a nanoparticle.

As used herein, the term "nanorod" refers to a rod-shaped nanoparticle having an aspect ratio greater than one.

Overview

A new simple, fast, inexpensive, efficient and scalable process discretely assembles metallic nanorods end to end using molecular self-assembly and bridges the interparticle gaps with metallic nanojunctions upon femtosecond (fs) irradiation, enabling charge transfer between plasmonic nanoparticles at optical frequencies.

Aspects of this work are described in Fontana et al., "Rise of the Charge Transfer Plasmon: Programmable Concatenation of Conductively Linked Gold Nanorod Dimers," ACS Photonics, 2016, 3 (5), pp 904-911 (including supporting information), incorporated herein by reference for the purposes of disclosing techniques relating to concatenating nanorods.

FIGS. 1A-1D depict the directed assembly process in schematic format. The primary constituents in the system are: metallic nanorods dispersed in a solvent, stabilizing molecules (not shown), and linking molecules (ionic surfactant or ligands) designed to concatenate the nanorods, although the method may possibly be generalized to metallic nanoparticles of arbitrary shape.

The stabilizing molecules typically attach to the cylindrical portion of the nanorods leaving the nanorod ends unprotected, allowing for additional chemistries to be carried out at the ends. In the below examples, poly(acrylic acid) (PAA) is used as a stabilizing molecule. PAA is an anionic polymer, which will tend to acquire a negative charge. Other anionic polymers such as poly(methacrylic acid) or halogenacrylic acid are expected to operate similarly.

The below examples use disodium chromoglycate (DSCG) as a linking molecule. DSCG is a lyotropic liquid crystal with two carboxylic acid moieties that can bind to metallic nanoparticles. It is expected that other liquid crystal molecules with at least two available carboxylic acid moieties might be used as linking molecules.

In embodiments, nanoparticles other than nanorods might be welded. In such instances, it is expected that an anionic polymer would preferentially coat relatively flat areas of the nanoparticles, leaving more pointed areas available for binding to the linking molecules.

The nanorod concatenation assembly may be based on electrostatic, covalent, and/or hydrogen bonding mechanisms. Through careful control of the linking molecules the rate and yield of dimer formation can be controlled. The dimer formation is primarily driven by diffusion, therefore at longer times higher order structures can form. Typically, desired reactions occur over long time spans (~hours/days) in relatively dilute suspensions (~$10^{12}$ nanorods/ml).

In embodiments, nanoparticles of two or more types can be joined, for example silver and gold nanorods. Dimers and larger nanostructures can be created that are periodic or aperiodic, for example with an A-B-A scheme, etc., and separated using techniques known in the art (e.g., centrifugation).

Figure 1A:
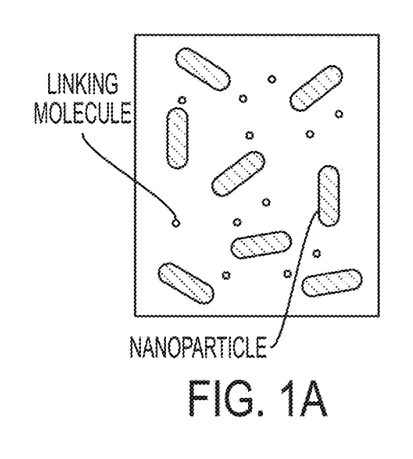
FIG. 1A shows a suspension of metallic nanorods, molecules (surfactant/ligands) and solvent.
Figure 1B:
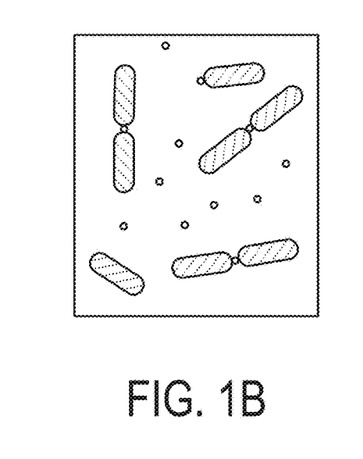
FIG. 1B shows molecular assisted end to end assembly of nanorod dimers. Femtosecond irradiation (FIG. 1C) results in fused nanorod dimers having metallic bridges (FIG. 1D).
Figure 1C:
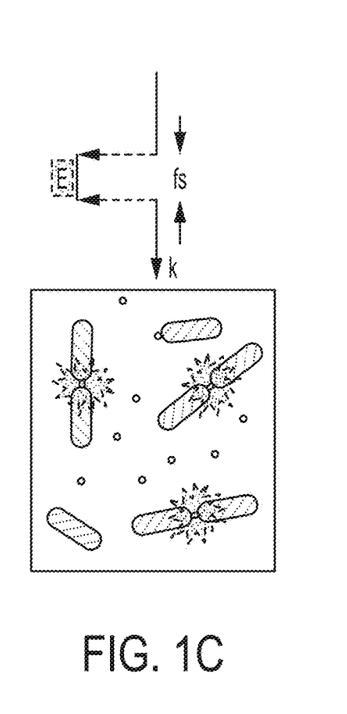
Figure 1D:
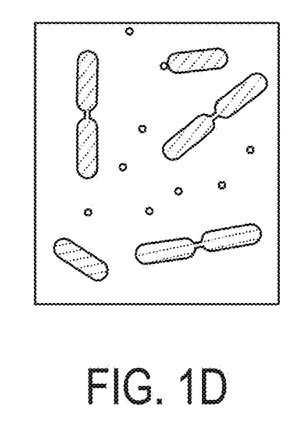

For a given reaction, at the optimal time/concentration for the largest yield of dimers, the suspension is irradiated with femtosecond laser light at the absorption peak of the coupled dimer mode, FIG. 1C, effectively 'welding' the nanorods together, FIG. 1D, via a metallic nanojunction, giving rise to a charge transfer plasmon mode.

In other embodiments, by controlling the time the nanorods are allowed to incubate, the number of nanorods forming the welded nanostructure can be controlled to obtain non-dimeric structures, for example to obtain oligomeric structures composed of more than two nanoparticles.

By irradiating the suspension with fs laser light the metallic atoms can be non-thermally melted (see Herrmann et al., "Threading plasmonic nanoparticle strings with light," Nat Commun 5 (2014)). The large electric field gradients in between the nanorods then serve to focus the metallic atoms thereby creating a conductive bridge between the two nanorods.

By irradiating the sample at the coupled dimer mode, the single nanorods in the suspension can continue to diffuse and react unaffected by the laser until a dimer is created, which then reacts to the laser and is then fused together into a fused dimer. If the suspension is then irradiated at the charge transfer mode of the fused dimers, 'double-dimer' may be formed. This process may be generalized to form discrete fused nanorod nanostructures of length $2^n$, where n is the number of nanorods. Reintroducing the linking molecules to the suspension may enable $2^n+1$ nanostructures (e.g., trimers).

The size, geometry and conductivity of the bridge may be controlled by modulating the linking molecules, buffer, solvent, laser fluence and wavelength.

In embodiments, the nanoparticle population following irradiation comprises a majority of (a) nanorod dimer pairs, with a lesser amount of either (b) unreacted monomers and/or (c) structures with more than two nanorods.

Example 1. Directed Assembly

Figure 2A:
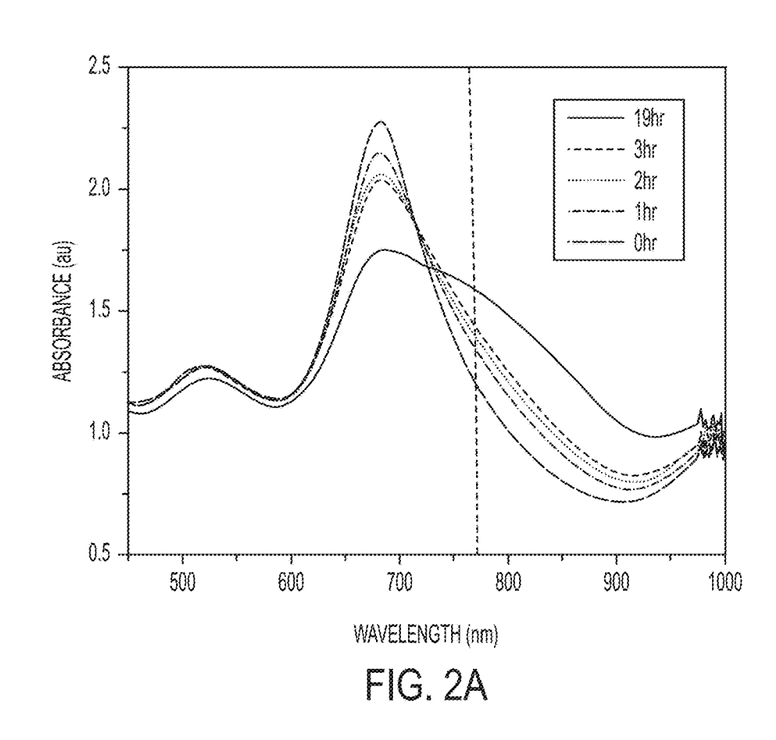
FIG. 2A shows disodium chromoglycate (DSCG) and gold nanorod self-assembly absorbance spectra evolution.

As an illustrative example, FIG. 2A shows the spectroscopic evolution of a self-assembly reaction for the nanorods. An aqueous suspension of gold nanorods (diameter=20 nm, length=70 nm, ~2 nM) initially stabilized in cetyltrimethylammonium bromide (CTAB), a positively charged surfactant, and subsequently coated with poly (acrylic acid) (PAA) is placed into a vial containing disodium chromoglycate (DSCG) (0.2 M), consistent with previous reports (see Park et al., Langmuir 24, 13833-13837 (2008)). The DSCG serves as a linking molecule.

Figure 2B:
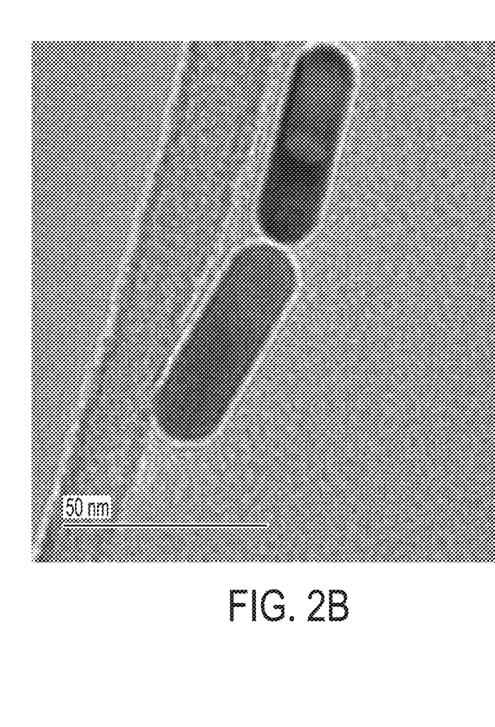
FIG. 2B is a transmission electron microcopy (TEM) image of a typical end to end assembly dimer after 3 hours of reacting.
Figure 3A:
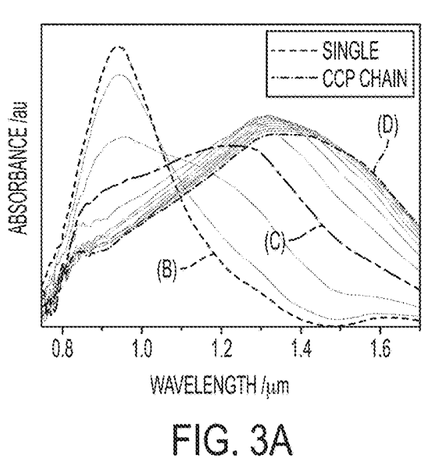
FIG. 3A shows the evolution of the absorbance spectrum during femtosecond (fs) exposure.
Figure 3B:
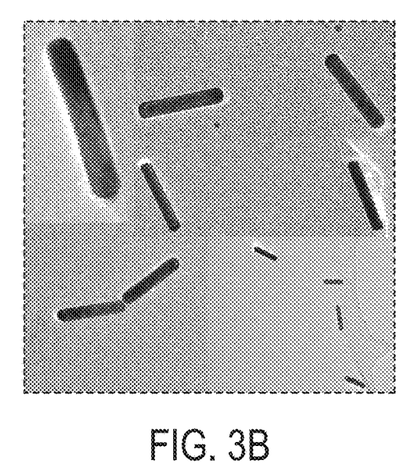
FIGS. 3B-3D shows representative TEM images of assembly at different time stages.
Figure 3C:
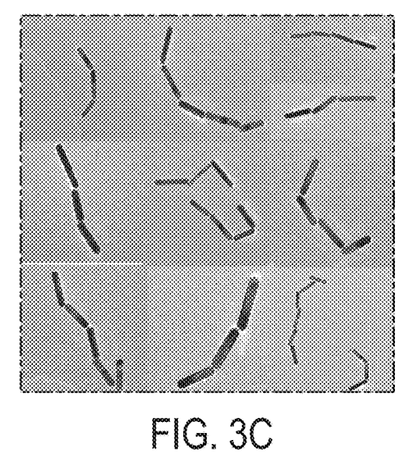
Figure 3D:
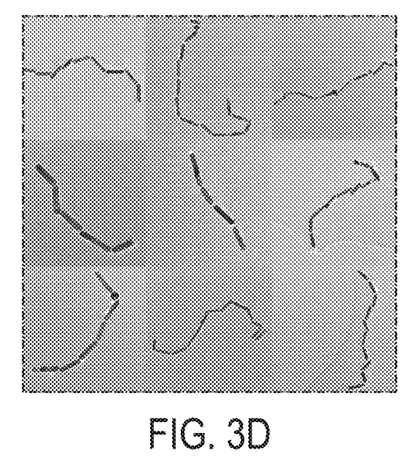

The negatively charged PAA coats only the cylindrical portion of the nanorods initially stabilized with the positively charged surfactant, leaving the hemispherical ends bare. Upon mixing of the DSCG molecules with the suspension, they are electrostatically repelled from the cylindrical portion of the nanorods coated with PAA and begin to attach at the nanorod ends. Slowly, over the course of hours, the nanorods are incubated forming concatenated nanorod dimers via the π-π stacking of the DSCG molecules The DSCG electrostatically attaches to the ends of the nanorods, slowly causing formation of dimers over the course of hours (and longer chains if the reaction runs sufficient long, >24 hrs). Initially the absorbance spectrum from the isotropic nanorods has two absorbance peaks, the transverse surface plasmon (TSP) corresponding to the transverse axis (520 nm) of the nanorods and longitudinal surface plasmon (LSP) resonance along the long axis (683 nm) of the nanorods. As the self-assembly reaction occurs the nanorods concatenate end to end leading to a new capacitive coupled absorbance peak (CCP) emerging at 775 nm. Transmission electron microscopy images confirm the end to end dimer formation after 3 hours, FIG. 2B. At longer times longer concatenated structures form.

A second assembly example is shown in FIGS. 3A-3D using dithiol molecules (1,6-hexanedithiol) to form longer chains, beyond dimers.

Example 2. Metallic Nanojunction Formation Via Femtosecond Irradiation

Once the self-assembly reaction has yielded sufficient dimer populations (reaction time=3 hr for the above case) the suspension is irradiated with a fs laser at the dimer absorbance peak (wavelength=774 nm, pulse energy=58 µJ, repetition rate=970 Hz, pulse width=275 fs, beam area=12.74 mm$^2$).

Upon irradiation a small dip in the absorbance is observed at 774 nm. This dip is believed to arise from scattering and immediately disappears if the laser is blocked and is independent of pulse repetition rate.

As the sample is irradiated the absorbance at 774 nm, corresponding to the coupled dimer mode, begins to decrease. A sharp isosbestic point forms at 837 nm, demonstrating the emergence of a second plasmon peak. The new peak, attributed to the charge transfer plasmon (CTP) mode, is clearly observed in the differential absorbance spectrum at 1,100 nm. After one hour of exposure the magnitude of the CTP peak has an absorbance of 0.25.

In agreement with theory (see Perez-Gonzalez et al., "Optical Spectroscopy of Conductive Junctions in Plasmonic Cavities," Nano Lett. 10, 3090-3095 (2010)) the longitudinal absorbance peak from the single nanorods starts to blue shift as the nanorod dimer are fused together from the reduction of capacitance inside the nanojunction. FIG. 4D shows the nanorods suspension before (left) and after irradiation (right) demonstrating the large throughput possible with this technique (2.5 ml/hr).

Example 3. TEM Characterization and Simulations

Figure 4A:
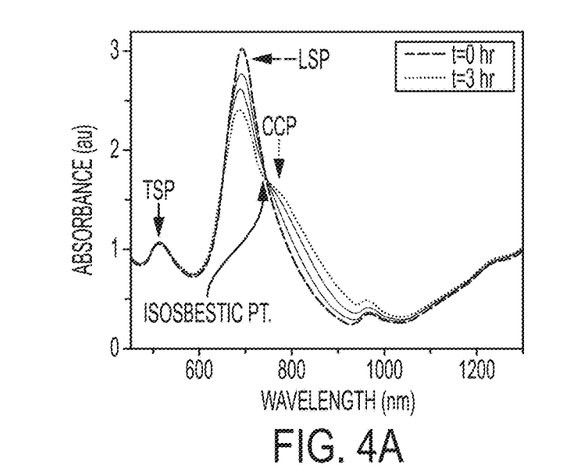
FIGS. 4A and 4B show the evolution of the absorbance spectra during assembly (a) and fs exposure (b).
Figure 4B:
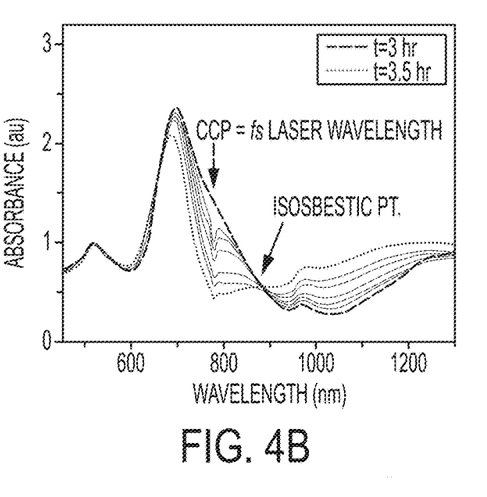
Figure 4C:
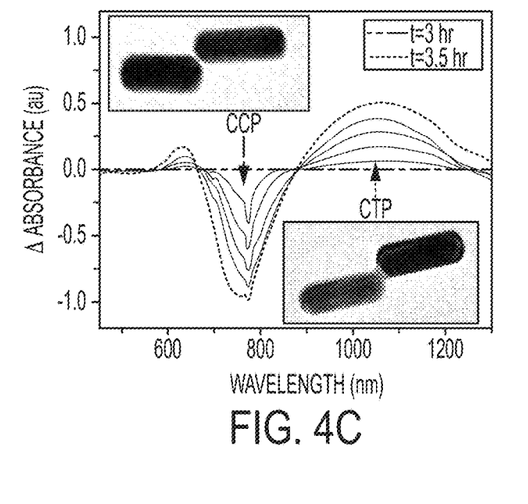
FIG. 4C shows differential absorbance from FIG. 4B.
Figure 4D:
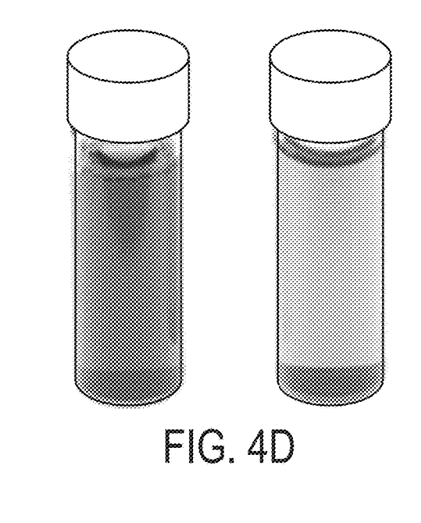
FIG. 4D is an image of the nanorod suspension (~trillion nanorods) before (left) and after (right) fs exposure and fused dimer formation.
Figure 5A:
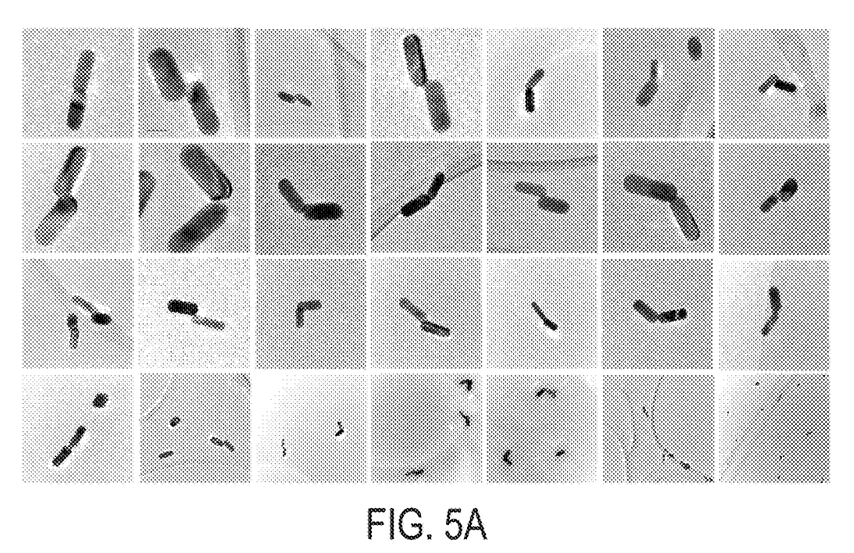
FIG. 5A is a series of TEM images of concatenated end to end gold nanorods dimers bridged with gold nanojunctions.

FIG. 5A shows TEM images of concatenated gold nanorod dimers fused together, in agreement with the spectroscopic evolution observed in FIG. 4C. As expected due to the faceted nanorod ends, the dimers can be end to end or slightly offset.

Figure 5B:
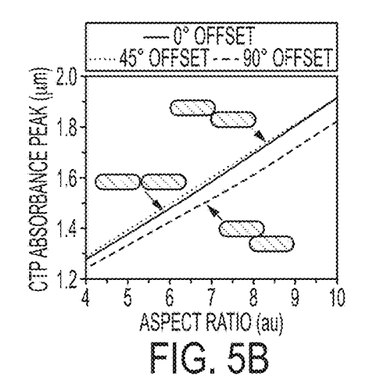
FIGS. 5B and 5C are three-dimensional finite element simulations of the charge transfer plasmon (CTP) dimer absorbance peak vs. contact point at the ends of the nanorods and relative nanorod orientation.
Figure 5C:
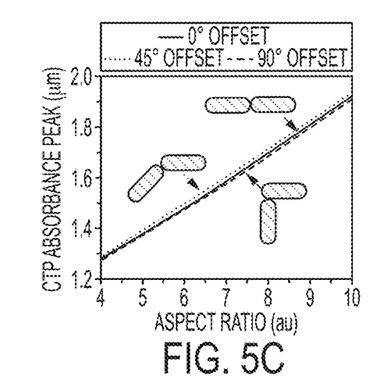
Figure 5D:
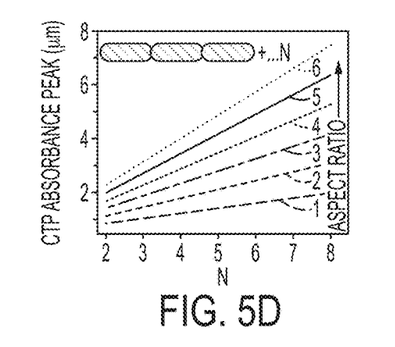
FIG. 5D shows CTP absorbance peak vs. chain length and aspect ratio.

Three-dimensional finite element simulations of the dimers reveal the absorbance peak is insensitive to the relative nanorod orientation or contact point at the ends of the nanorods, FIGS. 5B and 5C, which is supported experimentally by the sharp, high quality CTP absorbance peaks. The simulations also indicate that absorbance peaks shift linearly with the number of nanorods in the chains with a slope proportional to the aspect ratio and bridging gap diameter, FIG. 5D.

Figure 6:
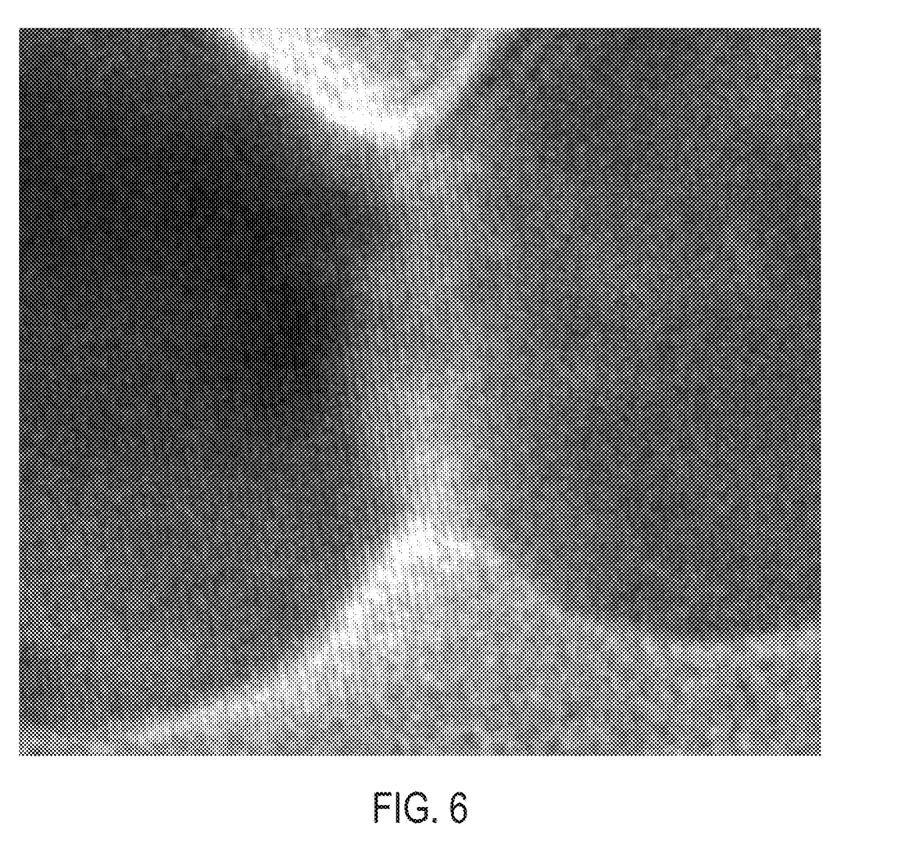
FIG. 6 is a TEM image of a gold nanojunction bridge connecting the nanorods into a unitary structure.
Figure 7:
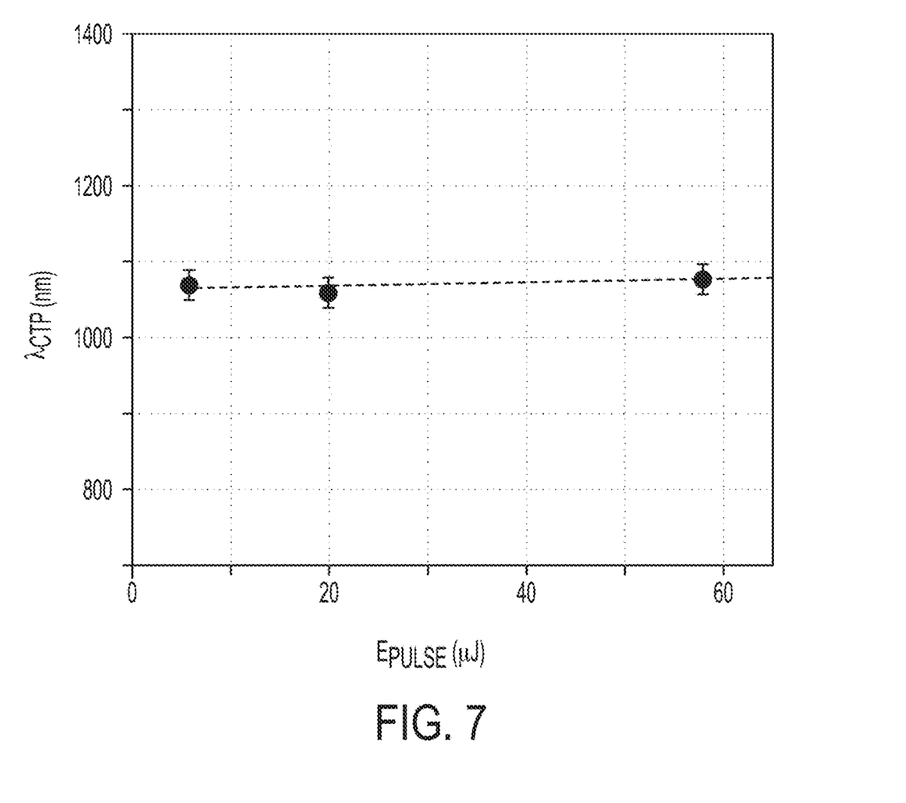
FIG. 7 shows CTP absorbance peak wavelength versus femtosecond laser pulse energy (wavelength=774 nm, repetition rate=970 Hz, pulse width=275 fs, beam area=12.74 $mm^2$).
Figure 8A:
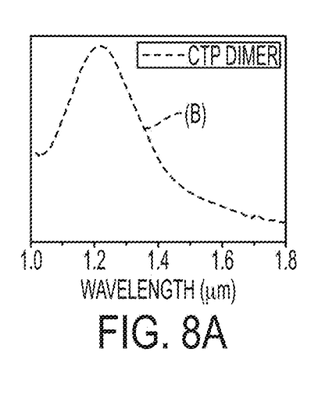
FIG. 8A shows the CTP absorbance peak for AR=2.8 dimers (a-blue), with representative TEM and population statistics (FIGS. 8B and 8C, respectively).
Figure 8B:
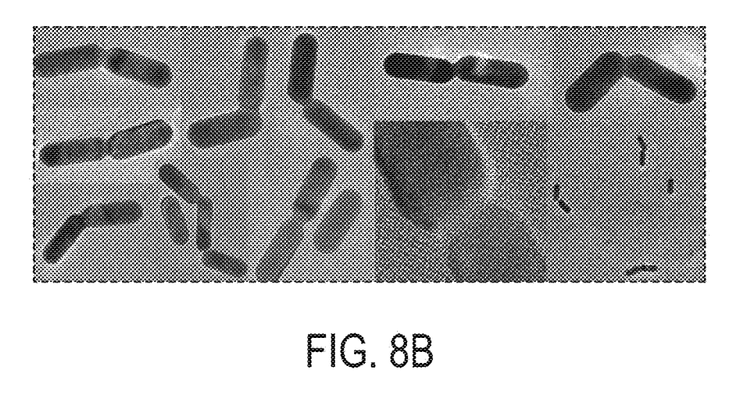
Figure 8C:
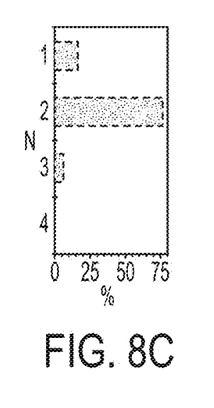
Figure 8D:
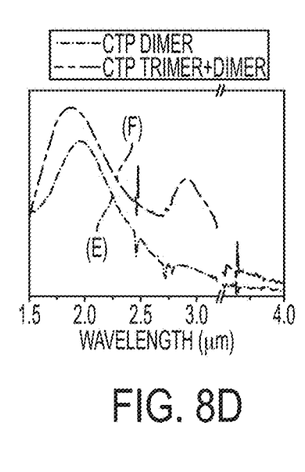
FIG. 8D shows the CTP absorbance peak for AR=5.4 dimers (e-orange) and trimers (f-red) with representative TEM images (FIGS. 8E and 8F) and population statistics (FIG. 8G).
Figure 8E:
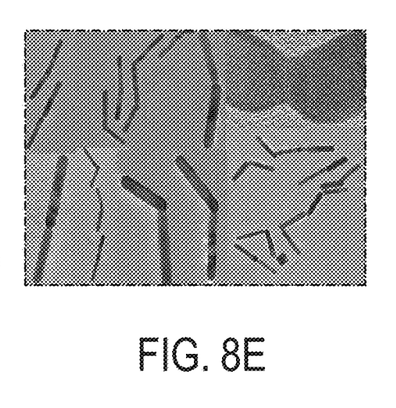
Figure 8F:
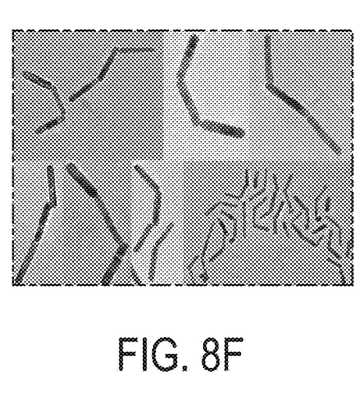
Figure 8G:
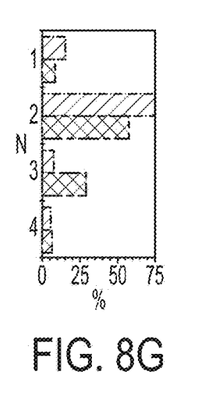

FIG. 6 shows a more magnified view of the dimer junction in between the nanorods. A periodic lattice can be seen indicative of gold, demonstrating the bridge linking the nanorods is gold.

Example 4. Pulse Energy Dependence

The pulse energy of the femtosecond laser was varied from 800 nJ to 58 µJ (free space value). If the suspension was exposed to below 2 µJ for one hour, no reaction was observed to occur as evidenced via spectroscopy and TEM analysis.

Above the approximately 2 µJ threshold, the suspension reacted forming the fused dimers. Surprisingly only a very small dependence was observed on the CTP absorbance peak wavelength for pulse energies from 2 µJ to 58 µJ, seen in FIG. 6. Subsequent TEM imagery further confirmed the bridge size and geometry to be approximately constant for this energy regime.

Example 5. Plasmonic Nanoantennas with Tunable Infrared Absorbance Peak

FIGS. 8A-8G show the absorbance spectra of gold nanorod dimers and trimers (aspect ratios=2.8 and 5.4) nanoantennas with widely tunable absorption peaks from 1 to 3 µm (FIGS. 8A and 8D), representative TEM images (FIGS. 8B, 8D, and 8F) and population statistics (FIGS. 8C and 8G), respectively.

The results in FIGS. 3A-3D and 8A-8G were achieved using different chemistries (covalent bonding rather than electrostatic in the liquid crystal case).

Alternative Embodiments

The process may control the assembly of nanorods end to end in discrete units using covalent, electrostatic or hydrogen bonding. The nanorods are typically sub-wavelength in dimensions. The nanorods may be composed of metals or semiconductors. The nanorods may be capped or coated with metals, semiconductors or organic molecules, to control the charge transport and optical resonances. Different linking molecules, solvents and/or buffers may be used to change the permittivity or permeability in or around the interparticle gap. Electromagnetic radiation not at a plasmon resonance may be used, for example ultraviolet light maybe used to maximize molecular absorption. Other nanoparticles composed of different materials and shapes may be used with this process. The process may be used to filter different size, shape or materials particles. The process is scalable to orders of magnitude larger volumes. These structures may be used to absorb and or scatter electromagnetic energy from ultraviolet to infrared wavelengths. Thermal reshaping (other than from light) may be used to link the nanoparticles together. The system may be used to mimic other optical system, through the use of charge transfer plasmonics. The laser pulse duration may vary from sub to hundreds of femtoseconds. External fields (e.g. electric, magnetic, pressure) or scaffolds (e.g. DNA, viruses, etc.) may be used to alter, aid or modify the nanoantenna assemblies.

Advantages and Applications

The proposed technique offers a simple, fast, inexpensive, efficient and scalable process that discretely assembles metallic nanorods end to end using molecular self-assembly and bridges the interparticle gaps with metallic nanojunctions upon femtosecond irradiation, enabling charge transfer between plasmonic nanoparticles at optical frequencies.

This process may be generalized to form discrete fused nanorod nanostructures of length 2n, where n is the number of nanorods. Reintroducing the linking molecules to the suspension may enable 2n+1 nanostructures.

The process discretely controls the nanometer scale dimer assembly and macroscale conductive linking throughput at a rate of at least trillion dimers per hour.

It is expected that the fused nanorods can find application as plasmonic nanoantennas, which are fundamental nanotechnology building blocks. In contrast to their radio and microwave counterparts, common use of plasmonic nanoantennas has been limited, due in part to the inability to synthesize these nanometer scale sized elements structures in large quantities. While high aspect ratio plasmonic nanorods remain challenging to efficiently produce, the synthesis of small aspect ratio (AR<6) plasmonic nanorods has become robust using seed-mediated approaches. Therefore a straightforward approach to solve this issue is to conductively link small aspect ratio nanorods end to end, creating tunable high aspect ratio plasmonic nanoantennas.

CONCLUDING REMARKS

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

REFERENCES

J. Fontana, and B. R. Ratna, "Tunable Resonances from Conductively Coupled Plasmonic Nanorods," US Patent Application Publication No. 20150247803

J. Fontana, and B. R. Ratna, "Highly tunable gold nanorod dimer resonances mediated through conductive junctions," Applied Physics Letters 105, 011107 (2014).

J. Fontana, N. Charipar, S. R. Flom, J. Naciri, A. Piqué, and B. R. Ratna, "Rise of the Charge Transfer Plasmon: Programmable Concatenation of Conductively Linked Gold Nanorod Dimers," ACS Photonics 3, 904-911 (2016).

L. O. Herrmann, V. K. Valev, C. Tserkezis, J. S. Barnard, S. Kasera, O. A. Scherman, J. Aizpurua, and J. J. Baumberg, "Threading plasmonic nanoparticle strings with light," Nat Commun 5 (2014).

H. S. Park, A. Agarwal, N. A. Kotov, and O. D. Lavrentovich, "Controllable Side-by-Side and End-to-End Assembly of Au Nanorods by Lyotropic Chromonic Materials," Langmuir 24, 13833-13837 (2008).

K. Park, M.-S. Hsiao, H. Koerner, A. Jawaid, J. Che, and R. A. Vaia, "Optimizing Seed Aging for Single Crystal Gold Nanorod Growth: The Critical Role of Gold Nanocluster Crystal Structure," The Journal of Physical Chemistry C 120, 28235-28245 (2016).

O. Perez-Gonzalez, N. Zabala, A. G. Borisov, N. J. Halas, P. Nordlander, and J. Aizpurua, "Optical Spectroscopy of Conductive Junctions in Plasmonic Cavities," Nano Letters 10, 3090-3095 (2010).

P. Pramod, and K. G. Thomas, "Plasmon Coupling in Dimers of Au Nanorods," Advanced Materials 20, 4300-4305 (2008).

What is claimed is:

1. A method of welding metallic nanorods, comprising:
    providing a suspension of metallic nanorods coated with an anionic polymer; then
    contacting with nanorods with linking molecules each comprising a liquid crystal with at least two available carboxylic acid moieties; then
    allowing the nanoparticles to self-assemble into dimers, then
    irradiating the dimers with femtosecond radiation, thereby forming a metallic junction therebetween and welding the dimers into fused dimers having a charge transfer plasmon (CTP) absorbance peak.

2. The method of claim 1, further comprising irradiating the fused dimers at the CTP absorbance peak to form nanostructures larger than the fused dimers.

3. The method of claim 1, further comprising re-introducing linking molecules after said irradiating, then irradiating again.

4. The method of claim 1, wherein the nanorods are gold.

5. The method of claim 1, wherein said anionic polymer is poly(acrylic acid) and said linking molecules are disodium chromoglycate.

* * * * *